(12) United States Patent
Bos

(10) Patent No.: US 6,191,501 B1
(45) Date of Patent: Feb. 20, 2001

(54) SECURITY SYSTEM FOR ALTERNATIVE ENERGY SUPPLIES

(75) Inventor: Hermanus A. Bos, Durban (ZA)

(73) Assignee: Merlin Gerin S.A. (Proprietary) Limited, Gauteng (ZA)

(*) Notice: Under 35 U.S.C. 154(b), the term of this patent shall be extended for 0 days.

(21) Appl. No.: 09/374,884

(22) Filed: Aug. 13, 1999

Related U.S. Application Data

(63) Continuation of application No. PCT/GB98/00330, filed on Feb. 16, 1998.

(30) Foreign Application Priority Data

Feb. 14, 1997 (ZA) ....................................................... 97/1248
Apr. 15, 1997 (ZA) ....................................................... 97/3173

(51) Int. Cl.[7] .................................................. G07F 15/00
(52) U.S. Cl. ............................................ 307/64; 307/66
(58) Field of Search ........................................ 307/64, 66

(56) References Cited

U.S. PATENT DOCUMENTS 4,337,466  6/1982  Spahn .
4,383,210 * 5/1983  Wilkinson ............................. 320/2

FOREIGN PATENT DOCUMENTS

| 3805677A1 | * 12/1982 | (DE) | ............................. H01H/27/06 |
| 39 18 203 A1 | 12/1990 | (DE) | . |
| 0 342 578 A1 | 11/1989 | (EP) | . |
| 2 689 333 A1 | 10/1993 | (FR) | . |
| 2100528 | * 12/1982 | (GB) | ............................. H01R/13/70 |
| 2 281 401 | 3/1995 | (GB) | . |
| 410165232 | * 6/1998 | (JP) | ................................ H02J/7/35 |
| WO88/06814 | * 9/1988 | (WO) | ............................. H02H/7/18 |

* cited by examiner

*Primary Examiner*—Fritz Fleming
(74) *Attorney, Agent, or Firm*—Darby & Darby

(57) ABSTRACT

Use of prepayment mechanisms for alternative energy supply systems and monitoring connected devices. An energy supply system is, for instance, an alternative energy source, such as a photovoltaic array (320) and an overriding prepayment mechanism (312) adapted to control the supply of useable energy (electricity) to a point of use in accordance with predetermined prepayment criteria. The photovoltaic array (320) incorporates, integral therewith, an energy source controller (318) that is in communication with a corresponding controller (316) forming part of the prepayment mechanism (312).

16 Claims, 3 Drawing Sheets

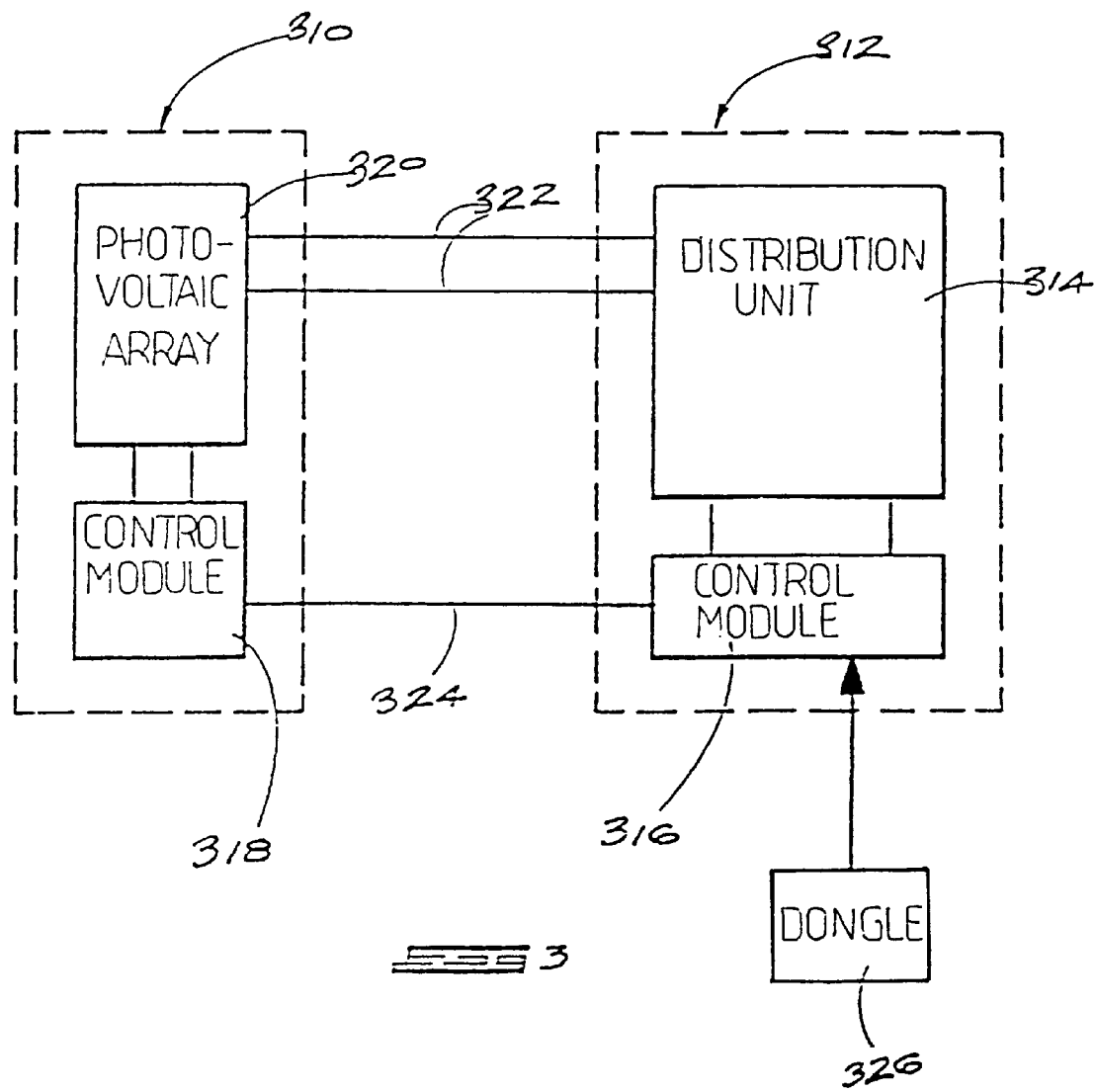

SECURITY SYSTEM FOR ALTERNATIVE ENERGY SUPPLIES

This application is a continuation of PCT/GB98/00330, filed Feb. 16, 1998, which designated the U.S.

BACKGROUND TO THE INVENTION

This invention relates to the use of prepayment mechanisms for alternative energy supply systems and to a system to monitor remotely connected devices and ancillary equipment, particularly those forming part of alternative energy supply systems.

A distinction should be drawn between alternative and renewable energy resources, the latter being a term that is often used incorrectly as being synonymous with the former. For example, large scale hydro-electric power generation, whilst utilising a renewable energy source, qualifies as a conventional form of energy supply, while small scale hydroelectric power generation in the form of a water wheel, for instance, is readily classifiable as an alternative form of energy supply. In the kinds of alternative energy supply systems contemplated by this invention, the energy generated by the system is applied directly to a single point of use or a small number of points of use. These systems are normally small, standalone systems or, at most, small community based systems that utilise available resources to generate energy.

Alternative energy supply systems are often regarded as a supply of "free" energy, but in reality they are nothing of the sort, bearing in mind the capital cost of the equipment and the cost: of maintenance. The need exists, in consequence, to control the use of such systems, preferably in proportion to the use of the system and the consumption of the energy provided by the system. However, it is typical of such alternative energy supply systems that the energy consumer exercises direct control over both the generation and the supply of the energy. This makes it more difficult to introduce practical control and payment mechanisms, such as the prepayment mechanisms frequently used to control the dispensing of utilities, such as gas, electricity and water. However, French Patent No. 2 689 333—Transenergie SA—describes a relatively simple prepayment system for alternative energy supplies. This system is loaded with credit by exchanging a removable control box for a new box with consumption credit loaded.

Allied to the above difficulties are the problems posed by theft and vandalism of this type of equipment. In the nature of these systems, they will be used in remote or inaccessible locations where they are vulnerable to abuse. Very often, the components of the system are useful on their own. This makes the equipment even more prone to theft and, while it is known to use protective housings to guard against theft, it might still be possible for a thief to remove components of the system for use in conjunction with other equipment.

South African Patent No. 97/1249—Amic Industries Limited—describes a security system that might be useful in guarding against this danger. This security system relies on the continuing integrity of a collection made up of a number of items, for instance a number of valuable appliances in a home. If one or more of the items is removed from the collection, this would constitute an alarm condition. The collection is defined by fitting a reporting device to each monitored item and including the item in the monitoring group of a monitoring device adapted periodically to detect the presence or absence of the reporting devices fitted to the items in the group.

Another approach to solving this problem is suggested by South African Patent No. 97/1105—Amic Industries Limited (and the patent applications related thereto:—United Kingdom Patent Application No. 97 02902.9 and German Patent Application No. 187 05 534.6). These applications describe a monitoring system for items of movable property. The monitoring system incapacitates the item by rendering the item useless if the item is not returned to a home base or its place of storage within a predetermined time.

SUMMARY OF THE INVENTION

According to this invention, an energy supply system comprises an alternative energy source that is adapted to collect energy and to convert the energy so collected to useable energy and an overriding prepayment mechanism adapted to control the supply of useable energy to a point of use in accordance with predetermined prepayment criteria, the energy source incorporating, integrally therewith, an energy source controller that is in communication with a corresponding controller forming part of the prepayment mechanism, the system being adapted at least temporarily to disable the output of useable energy from the energy source on receipt, by the energy source controller, of an appropriate communication from the prepayment mechanism controller.

The energy source controller is preferably permanently incorporated in the energy source such that any attempt at access to or removal of the energy source controller will lead to at least partial destruction of the energy source.

The energy source controller may be adapted at least temporarily to disable the output of useable energy from the energy source if communication with the prepayment mechanism controller is lost. To this end, the term "appropriate communications" as between the energy source controller and the prepayment mechanism controller could refer to the loss and re-establishment of communications and, additionally or in the alternative, to the transmission of suitable communications between the two. In each case, the communication preferably involves the use of encrypted codes that are transmitted either unidirectionally or bi-directionally between the energy source controller and the prepayment mechanism controller.

The system should also be capable of enabling the output of useable energy from the energy source on re-establishment of the appropriate communications between the energy source controller and the prepayment mechanism controller.

In the preferred form of the invention, the energy source is constituted by a photovoltaic array and the useable energy supplied by the system is supplied in the form of electricity that is stored in a battery and applied to a useful load, such as lights or the like. To enhance the security of the system, the load may be adapted to operate at a voltage or frequency different to that of the battery voltage. In addition, the battery may be adapted to operate at a voltage different to that of electrical appliances conventionally available.

The invention includes a method of controlling an energy supply system comprising an alternative energy source that is adapted to collect energy and to convert the energy so collected to useable energy and an overriding prepayment mechanism adapted to control the supply of useable energy to a point of use in accordance with predetermined prepayment criteria, characterised by the introduction, integrally into the energy source, of an energy source controller and the provision of a corresponding controller forming part of the prepayment mechanism, the method including the steps of transmitting a communications signal between the energy source controller and the prepayment mechanism controller and disabling, at least temporarily, the output of useable energy from the energy source on receipt, by the energy source controller, of an appropriate communication from the prepayment mechanism controller.

In one form of the intention, the output of useable energy from the energy source is disabled at least temporarily if communication with the prepayment mechanism controller is lost and in this embodiment, the output of useable energy from the energy source is re-enabled on reestablishment of the appropriate communications between the energy source controller and the prepayment mechanism controller.

The transmissions between the energy source controller and the prepayment mechanism controller are preferably encrypted and transmitted, unidirectionally or bi-directionally, between the energy source controller and the prepayment mechanism controller.

In energy supply system in which the useable energy is supplied in the form of electricity that is stored in a battery and applied to a useful load, the method may conveniently include the step of operating at least a part of the load at a voltage or frequency different to that of the battery voltage. Alternatively, or in addition, the battery can be operated at a voltage different to that of electrical appliances conventionally available.

In the preferred form of the invention, the energy source controller is integrated into the energy source in such a manner that any attempt at access to or removal of the energy source controller will lead to at least partial destruction of the energy source.

BRIEF DESCRIPTION OF THE DRAWINGS

In the drawings:

FIG. 3 is a diagram illustrating a monitoring system for use with a photovoltaic system incorporating the invention.

DESCRIPTION OF EMBODIMENTS OF THE INVENTION

A major concern regarding domestic photovoltaic energy supply system is how affordable the system will be. The typical customer for such systems is often poor and would normally require some form of funding. In most cases the potential customer has no collateral making it difficult for a bank to fund the energy supply system. There is no guarantee that the users will pay an instalment or rental.

However, pre-payment metering systems such as those in use in conventional power reticulation systems do allow a periodic payment mechanism for the use and maintenance of the system. In such metering systems, if a payment is not made then the system is disabled.

Figure 1:
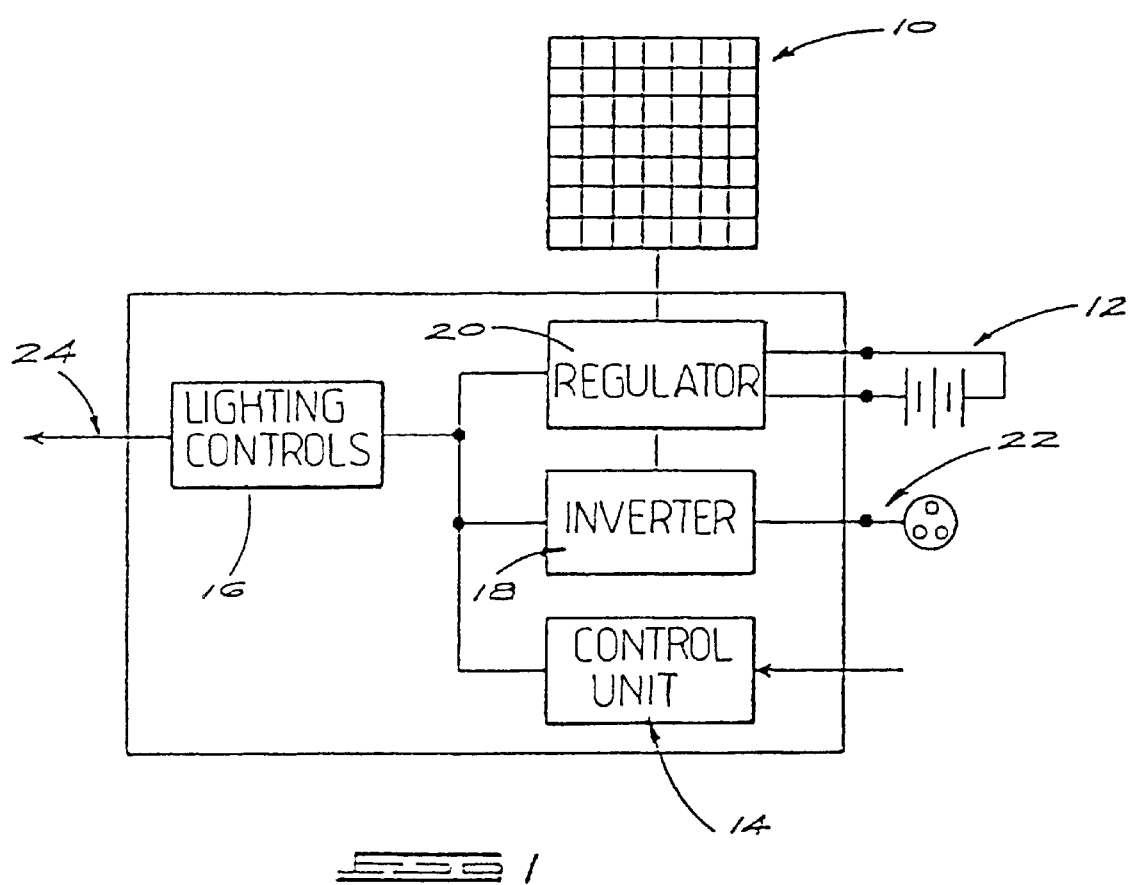
FIG. 1 is a diagram illustrating one embodiment of a photovoltaic system incorporating the invention.

The system illustrated in FIG. 1 comprises an energy source in a form of a solar panel or photovoltaic cell array 10. The electrical power output by the solar array 10 is stored in a battery 12 that is connected to the solar array 10 through a control unit 14 that operates under the overriding control of a prepayment mechanism.

The system includes conventional circuitry in the form of lighting controls 16 and an inverter 18 as well as a regulator 20. The lighting controls 16 are connected to an external lighting circuit 24 that carries lights (not shown) for use by the consumer. Electrical power for use by the consumer in operating electrical appliances is output on an output circuit 22. The inverter 18 is connected to the power output circuit 22 on which power is output at conventional voltages and frequencies (220V, 50 Hz in South Africa).

Figure 2:
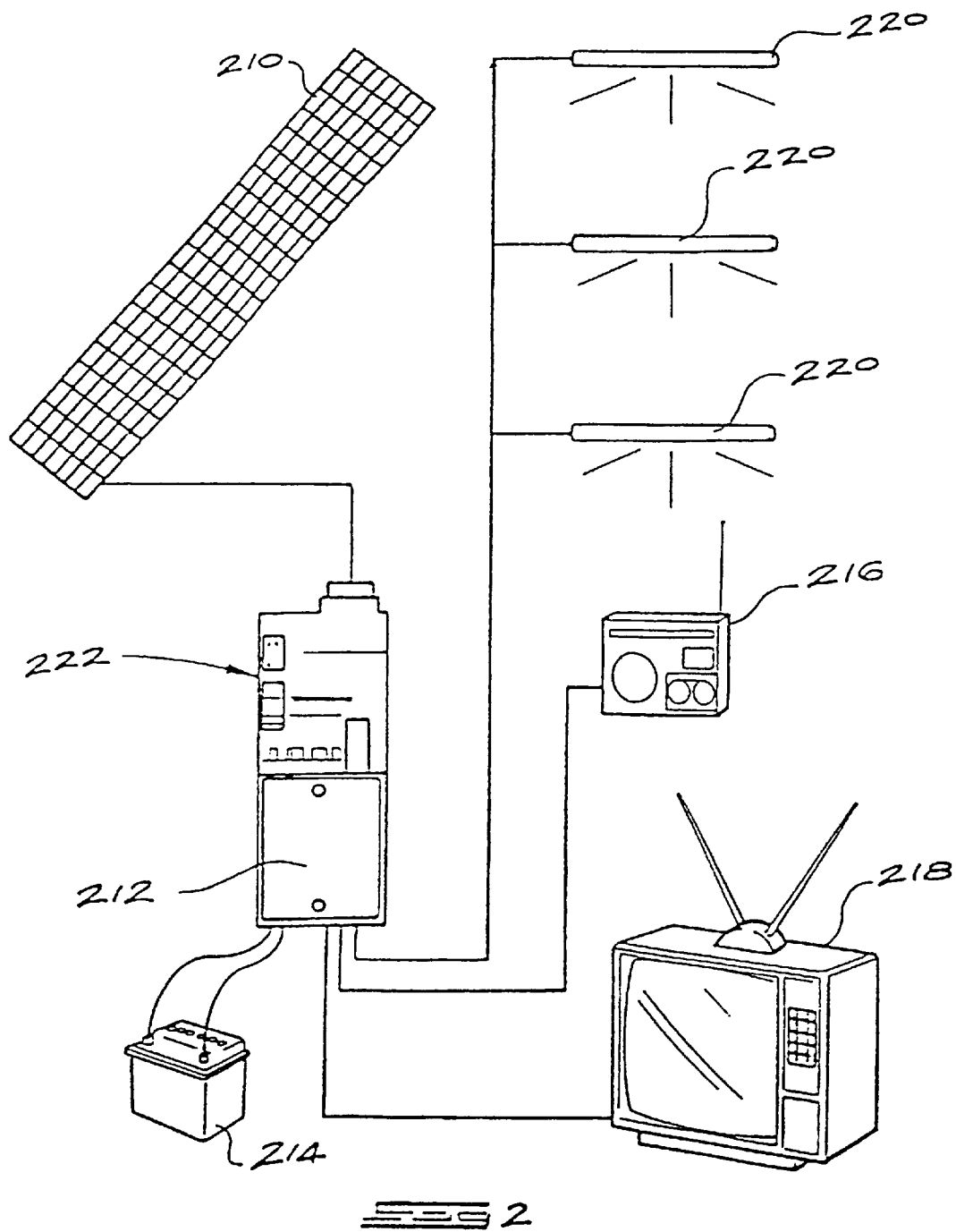
FIG. 2 is a diagram illustrating a second embodiment of the photovoltaic system incorporating the invention.

A similar system is illustrated in FIG. 2 which shows a typical low cost domestic photovoltaic energy supply system consisting of a solar panel 210, a battery charge controller 212 and a battery 214. Outputs are provided for a lighting circuit and normally for a 12V radio 216 and, if appropriate, for a 12V television set 218. The system can be sold together with a number of low wattage (typically 7 W) 12V fluorescent light fittings 220 for connection into the lighting circuit.

Larger systems would consist of multiple solar panels, larger capacity batteries, charge controllers and 230V inverters. These are typically used in larger dwellings, clinics and schools.

The battery charge controller 212 forms part of an integrated control unit 222 incorporating a microprocessor that controls all aspects of the charge controller 212 including the prepayment mechanism and charge and discharge current and voltage.

Like the system illustrated with reference to FIG. 1, the control unit 222 (and therefore the entire system) operates under the overriding control of the prepayment mechanism.

The control unit 222 is provided with a user interface consisting of light emitting diodes (LED's) that indicate at least the following:

usage—in time battery charge level token acceptance (for token-based payment mechanisms)

errors within the system.

The control unit 2222 is located in a housing that permits no direct access to any of the electronics, switching or measuring elements housed therein. The housing is secure and the possibility of malfunction on forced insertion of foreign objects or fluids is minimised. In addition, the housing is designed to provide visible evidence of unauthorised entry or tampering, preferably through destruction of the housing seals.

The battery 214 is chosen for a long cycle life as well as an ability to withstand regular deep discharge and to operate for prolonged periods under partial state of charge conditions.

The electronic elements in the housing are isolated from the battery 214 and the battery enclosure itself is readily accessible, well ventilated to disperse gases and provided with drain channels to divert any battery fluid overflows. There is no exposed wiring and the battery is capable of being checked and filled easily.

The battery charge parameters will differ for each configuration and battery supplier. For this reason these parameters are preferably soft programmable into the control unit 222.

All wiring is of be copper that is sized to keep voltage drops to less than 5 percent between battery and the load.

The system will preferably also have a distribution panel that allows users to connect additional loads simply and safely. The system does not permit direct battery connections.

The prepayment mechanisms in both the systems described above require the loading of credit information by the consumer which, preferably, enables time delimited usage of the energy supply system. Once loaded into the control unit 14, 222, the credit information permits the output of usable power to the appliances connected into the system. When the time delimited period elapses, the load is disconnected from the appliances. The load to the appliances is only enabled after authorised credit information is entered into the control unit 14, 222.

To ensure there is no degradation of the battery, the system permits charging of the battery during any load disconnect phase. However, this charge period will not extend beyond a few days to ensure the system is not abused or by-passed using this feature.

The majority of prepayment mechanisms utilise tokens that take the form of magnetic cards, magnetic tokens or smart cards that are inserted into a card reader in the prepayment mechanism in order to load credit information.

For the magnetic card version, which is preferred, the system erases or corrupts the data after successful entry of the credit information into the system. In addition, the token can be disfigured. Magnetic cards, for instance, can be punched automatically to render the card useless after a successful credit download.

With keypad systems, the consumer could merely be given a code that is entered by means of the keypad.

In magnetic card-based systems, the card contains credit information that is loaded into the system which, once loaded, increments a credit register in the control unit 14, 222. This then permits the use, by the consumer, of a predetermined time-delimited quantity of electricity. On loading the credit into the control unit 14, 222, time information stored in the encrypted data on the card is transferred to the control unit 14, 222 and added to the credit remaining.

The cards are preferably purchased pre-coded in units of several days (normally 30) and are coded within common groups. This allows a number of the photovoltaic system of this invention to be grouped together to form a secure unit representing a single owner or mini utility. The mini utility owner is then able to issue tokens to users in the group without the need for vending equipment. Cards purchased for a group should not be useful outside that group.

The control unit 14, 222 is connected to a multiplicity of the components of the system to provide several levels of control over the system components. As a first level of control, the control unit 14, 222 is connected to the output circuits to enable or disable the flow of electricity to the power output circuit.

To add a further level of control, the control unit 14, 222 can be connected to the battery regulator in order to enable or disable the flow of electricity from the solar array to the battery. As an alternative, or in addition, the control unit 14, 222 so connected to the regulator may be adapted to enable or disable the flow of electricity from the battery to either or both the lighting control circuit and any inverter incorporated in the system.

The output circuits, such as the lighting circuit can conveniently be adapted to operate on a voltage or frequency different to the battery voltage. This will require the use of lighting appliances that operate at such a unique voltage and frequency and has the advantage of preventing the consumer from using the lighting appliances directly from the battery.

It is, of course, also possible to operate the battery at an unconventional voltage thereby to prevent the use of third party appliances directly from the battery, most of which appliances operate at conventional voltages and frequencies.

The most effective control, however, is provided by connecting the control unit 14, 222 to the solar array to enable or disable the ability of the solar array to output usable electricity in dependence on the prepaid credit criteria of the control unit 14, 222. This can be achieved through location of a disconnect device in the fabric of the solar panel, so that disconnection takes place within the solar panel.

This control mechanism is illustrated in FIG. 3 which shows a solar panel (indicated in dashed outline 310), and a control unit (indicated in dashed outline 312).

The control unit 312 incorporates a battery and such circuitry 314 as is necessary to control the operation of the solar panel 310 and the storage and distribution of the electricity. The control unit 312 is normally located within secure premises.

Controllers or control modules 316, 318 are located in the control unit 312 and the solar panel 310 respectively. The controllers 316, 318 are electronically matched by means of encrypted keys.

The solar panel 310 is made up of a photovoltaic array 320 and its control module 318. The solar panel control module 318 is integrated into the photovoltaic array 320 by lamination into the fabric of the array 320. This is done in such a manner that any attempt to get at the control module 318 will result in the destruction or partial destruction of the solar panel 310, thereby rendering it permanently useless.

The electrical energy derived from the photovoltaic array 320 is transmitted to the control unit 312 by means of conventional power lines 322.

The control unit and solar panel control modules 316, 318 are in communication with one another across communications links 324 that are integral with the power lines 322, although it is possible to use an independent link, such as a radio frequency link.

The solar panel controller 318 is in communication with its corresponding controller 316 forming part of the prepayment mechanism. The system is adapted to disable the output of useable energy from the solar panel 310 on receipt, by the energy source controller 318, of an appropriate communication from the prepayment mechanism controller 316.

The communications link 324 is used by the control unit control module 316 to poll or interrogate the solar panel control module 318 continuously. Should there be any break in communications or if the control unit module should send the appropriate command (such as a "no credit" command), the control module 318 will disable operation of the photovoltaic array 320.

In order to enhance security, any break in communications can be used to trigger an alarm at the control unit 312 to alert the user of the possibility of theft or damage to the solar panel 310.

Disablement of the photovoltaic cell array 320 will be temporary in the sense that, should communications on the communications link 324 be re-established and should the control unit controller 316 send the appropriate command, the solar panel 310 will continue to operate normally by discharging electricity to the distribution unit and battery 314.

However, should communications between the control unit control module 316 and the solar panel control module 318 not be re-established, the solar panel 310 will remain non-operational even if an attempt is made to connect the solar panel 310 directly to a battery and charger or to a non-matching control unit.

The protocol for communication along the communication link 324 will preferably be designed to require the use of encrypted and continuously changing codes to be exchanged between the control unit 312 and the solar panel 310. Such an exchange of codes can be unidirectional or bi-directional. The use of changing encrypted codes will ensure that the code cannot be learnt or copied by some form of electronic eavesdropping for later replay to the solar panel control module 318 in order to render the solar panel 310 operational once more.

In addition, the control units 316, 318 can be matched, by means of conventional programmable logic devices, to require a special sequence of events to initialise the monitoring systems to match the solar panel control module 318 to the host control module 316. This will prevent the possibility of a removed solar panel 310 being connected to a second host. It will also permit re-installation of a solar panel 310 to its matching host control unit 312.

The solar panel control module is preferably constituted by a microprocessor.

During manufacture of the solar panel 310, the microprocessor device is installed with a known key which is initialised and configured to a working key during the installation of the photovoltaic system at the premises of a user. The working key is unique to a dongle 326 that is interfaced with the control module 316 of the control unit 312. The working key is derived from the dongle 326. Each system will have its own working key derived from the dongle 326 supplied with and unique to the system.

As long as the solar panel controller is connected to its associated control unit 312 and the control unit 312 is activated by token credit, then the solar panel will produce a voltage output. If the control unit 312 credit should run out or if the solar panel is stolen or tampered with, communication between the solar panel controller and its associated control unit 312 will be disrupted. The solar panel controller will then cause the voltage supply output of the panel itself to cease.

Any attempt to access the solar panel controller will cause the destruction of the solar panel. This means that the panel 310 can not be used without its associated control unit 312 nor can the solar panel 310 be connected directly to a battery. This enhances the control mechanism provided by the system and, in addition, renders the solar panel useless in the hands of thieves.

The theft of the solar panel is less of a problem for privately owned domestic photovoltaic energy supply systems. In these situations, by-passing the control unit 312 to obtain unauthorised credit is more of a problem. The control unit 312 therefore has three functions:—to regulate the charging and discharge of the battery, payment control and security.

In the control unit 312 of the invention, these functions are all integrated under the control of a single microprocessor. This ensures the integrity of the control unit 312 and greatly enhances the overall security of the photovoltaic system.

The security system described above can be used to protect solar panels used in other applications. The inclusion of the system within the panel will render the panel useless if it is stolen. This is ideal for unmanned solar sites as used by the telecommunications industry and other unmanned sites.

Traditionally, alternative energy supply systems such as the photovoltaic system described above are purchased by consumers for their own account. It will be appreciated that these systems are expensive and this has mitigated against widespread use of these systems, particularly in the sub-economic housing environment. However, increased use of alternative energy sources is widely advocated as being environmentally more acceptable than continued exploitation of nuclear and carbon-based energy sources.

For this reason, electrical utility companies have experimented with the provision of alternative energy supply systems, such as photovoltaic electrical supply systems. In order to recoup the cost of the system, the utility then levies a monthly fee to cover the financing of the capital cost, the use and maintenance of the system.

In such a situation in particular, it is believed that the alternative energy supply system of the invention will ensure that the levies are paid while simplifying collection of such payments.

What I claim as new and desire to secure by Letters Patent is:

1. An energy supply system comprising:
   an alternative energy source adapted to collect energy and to convert the energy so collected to useable energy;
   an overriding prepayment mechanism adapted to control the supply of useable energy from the energy source to a point of use in accordance with predetermined prepayment criteria; and
   an energy source controller integrally incorporated in said energy source in communication with a corresponding controller forming part of the prepayment mechanism;
   the energy source controller operating to at least temporarily disable the output of useable energy from the energy source to the point of use on receipt of an appropriate communication from the prepayment mechanism controller.

2. An energy supply system according to claim 1 wherein the energy source controller operates to at least temporarily disable the output of useable energy from the energy source upon communication with the prepayment mechanism controller being lost.

3. An energy supply system according to claim 2 further comprising means to enable the output of useable energy from the energy source to the point of use on re-establishment of the appropriate communications between the energy source controller and the prepayment mechanism controller.

4. An energy system according to claim 1 further comprising a communication link between the energy source controller and the prepayment mechanism controller including means to transmit encrypted codes, unidirectionally or bi-directionally, between the energy source controller and the prepayment mechanism controller.

5. An energy supply system according to claim 1 in which the energy source comprises a photovoltaic array.

6. An energy supply system according to claim 1 further comprising a battery to store electricity to be applied to a useful load, at least a part of the load being adapted to operate at a voltage or frequency different from that of the battery voltage.

7. An energy supply system according to claim 6 in which the battery is adapted to operate at a voltage different to that of electrical appliances conventionally available.

8. An energy supply system according to claim 1 in which the energy source controller is permanently incorporated in the energy source such that any attempt at access to or removal of the energy source controller will lead to at least partial destruction of the energy source.

9. An energy supply system according to claim 1 wherein said alternative energy is self-contained and does not receive energy from an electrical grid.

10. A method of controlling an energy supply system comprising the steps of:
    providing an alternative energy source adapted to collect energy and to convert the energy so collected to useable energy;
    providing an overriding prepayment mechanism adapted to control the supply of useable energy from the alternative energy source to a point of use in accordance with predetermined prepayment criteria;
    integrating into the energy source an energy source controller;

providing a corresponding controller as part of the prepayment mechanism;

transmitting a communications signal between the energy source controller and the prepayment mechanism controller; and disabling, at least temporarily, the output of useable energy from the energy source on receipt, by the energy source controller, of an appropriate communication from the prepayment mechanism controller.

11. A method of controlling an energy supply system according to claim 10 in which the output of useable energy from the energy source is disabled at least temporarily if communication with the prepayment mechanism controller is lost.

12. A method of controlling an energy supply system according to claim 11 in which the output of useable energy from the energy source is re-enabled on re-establishment of the appropriate communications between the energy source controller and the prepayment mechanism controller.

13. A method of controlling an energy supply system according to claim 10 in which the transmissions between the energy source controller and the prepayment mechanism controller are encrypted and transmitted, unidirectionally or bi-directionally, between the energy source controller and the prepayment mechanism controller.

14. A method of controlling an energy supply system according to claim 10 in which the useable energy is supplied in the form of electricity that is stored in a battery and applied to a useful load, the method including the step of operating at least a part of the load at a voltage or frequency different to that of the battery voltage.

15. A method of controlling an energy supply system according to claim 14 including the step of operating the battery at a voltage different to that of electrical appliances conventionally available.

16. A method of controlling an energy supply system according to claim 10 including the step of incorporating the energy source controller in the energy source such that any attempt at access to or removal of the energy source controller will lead to at least partial destruction of the energy source.

* * * * *